Sept. 6, 1955  F. LINDBLOOM  2,717,169
VEHICLE DOOR LOCK
Filed March 5, 1954
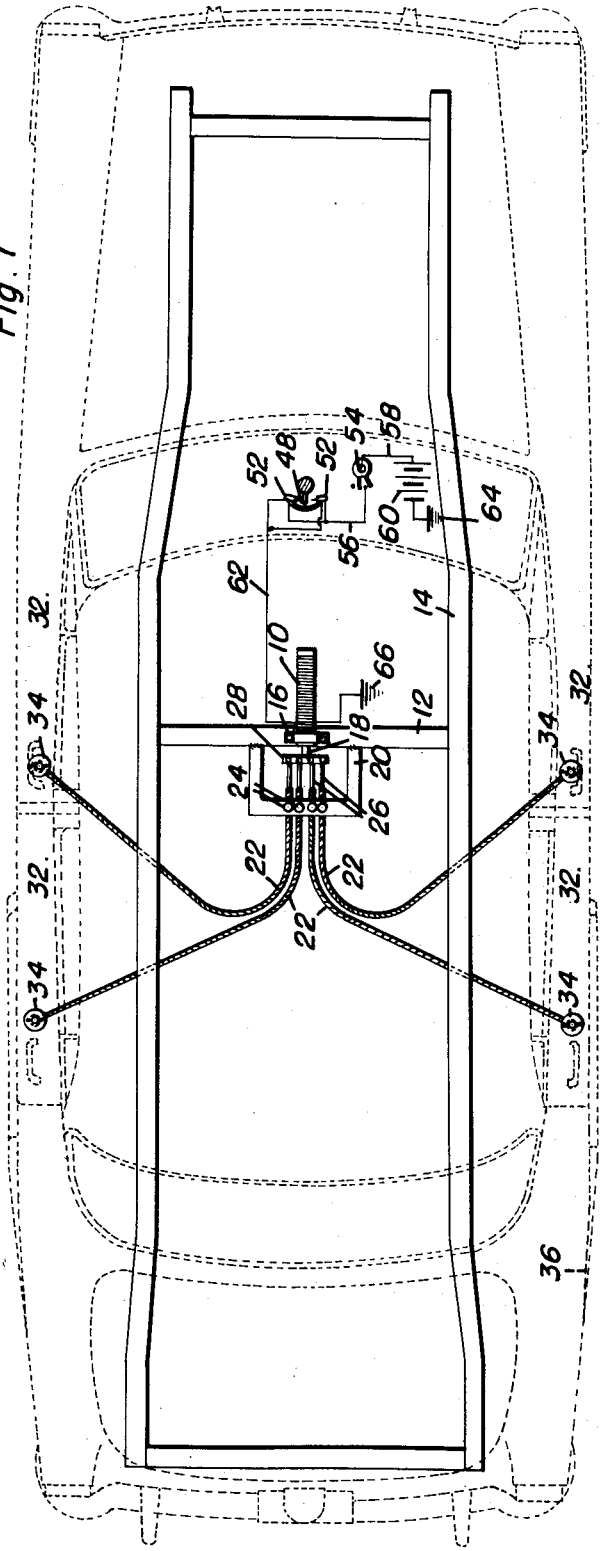
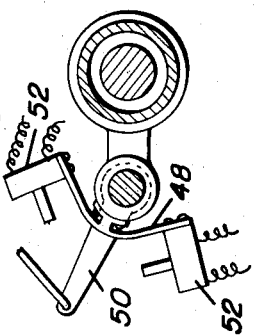
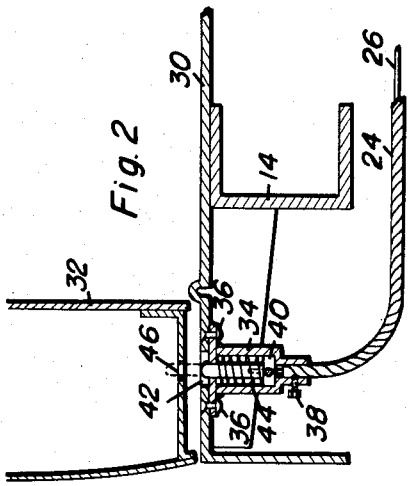
Franz Lindbloom
INVENTOR.

2,717,169

VEHICLE DOOR LOCK

Franz Lindbloom, Chicago, Ill.

Application March 5, 1954, Serial No. 414,348

1 Claim. (Cl. 292—144)

This invention relates to a vehicle door lock and more particularly to an improved means for locking the doors of automobiles or similar vehicles when the vehicle is in motion.

An object of this invention is to provide a novel type of vehicle door lock which can be easily mounted on the existing types of automobile frames and used in conjunction with the conventional door locks.

Another object of this invention is to provide a vehicle door lock which will automatically lock the doors of the vehicle when the gear shifting lever is moved to any driving position.

A further object of this invention is to provide a vehicle door lock comprising a plurality of plungers which are adapted to engage the doors of the vehicle to prevent the opening of the same and which plungers are urged into operative position in a novel manner.

A further object of this invention is to provide a vehicle door lock which is simple and efficient in construction and durable and lasting in use.

These together with other objects and advantages which will become subsequently apparent reside in the details of construction and operation as more fully thereinafter described and claimed, reference being had to the accompanying drawing forming a part hereof, wherein like numerals refer to like parts throughout and in which:

Figure 1 is a top plan view of a vehicle chassis with the body indicated thereon in dotted lines and showing the improved door lock forming the subject of this invention mounted thereon;

Figure 2 is an enlarged sectional view illustrating one of the plungers for locking a door in closed position; and Figure 3 is an enlarged sectional view illustrating the mounting of the switches for controlling the electro-magnetic device forming a part of the vehicle door lock.

Referring now more particularly to the accompanying drawings, it will be seen that the improved vehicle door lock forming the subject of this invention includes an electro-magnetic device 10 adapted to be mounted in a fixed position on a cross brace 12 of a vehicle chassis 14. A bracket 16 engages the electro-magnetic device 10 while securing the same in position on the cross member 12. The electro-magnetic device 10 is preferably of a solenoid which when energized will urge the core 18 thereof outwardly, or in a direction toward the left of Figure 1 when energized.

Secured to the cross member 12 is a U-shaped frame 20. The frame 20 forms a support for one end of a plurality of flexible conduits or cable housings 22. Suitable fasteners 24 may be used for securing the cable housings 22 to the frame 20. Flexible cables or Bowden wires 26 extend through each of the cable housings 22 and are each connected at one end to a bar 28 which is disposed within the frame 20. The bar 28 is in turn connected to the other end of the core 18 of the electromagnetic device 10.

Secured to the chassis 14 of the vehicle is a body 30. A plurality of doors 32 are mounted on the body 30. Secured to the floor portion of the body 30 and in alignment with each of the doors 32 is a cylinder 34. The cylinders 34 may be secured to the body 30 by any suitable fasteners 36. A cable housing 22 is secured to one end of each of the cylinders 34 by means of a suitable fastener 38. The flexible cable 26 extends within each cylinder and is secured in any suitable manner to a slidable bolt or plunger 40. The floor of the body is provided with apertures 42 through which each plunger 40 is adapted to extend. A coil spring 44 is disposed within each cylinder 34 and engages each plunger 40 for urging the same to a position within each cylinder 34. The doors 32 are provided with apertures 46 into which each plunger 40 can be inserted when the electro-magnetic device is actuated. This will lock each door against opening movement.

In order to provide means for automatically locking the doors in closed position when the vehicle is in operation, a bracket 48 is mounted in a stationary position adjacent the shifting lever 50 of the vehicle. Mounted on each end of the bracket 48 is a microswitch 52 which is adapted to be engaged by the shifting lever and to be moved to closed position thereby. Each of the microswitches 52 is connected to the ignition switch of the vehicle by electrical conductors 56. A suitable electrical conductor 58 connects the ignition switch 54 with the conventional battery 60. The other contacts of the microswitches are connected by suitable electrical conductors 62 to the electro-magnetic device 10. The battery 60 is suitably grounded to the frame of the vehicle as at 64 and the electro-magnetic device 10 is grounded to the frame as at 66. In practical use of the device, the bracket 20 is mounted on a cross member 12 and the floor of the body 30 and the lower face of the doors 32 are provided with aligned apertures. Then, the cylinders 34 having the plungers 40 mounted therein, are mounted in position on the body 10. The cables 26 are connected to the plungers 40 and at their other ends to the bar 28 which is connected to the core 18 of the electro-magnetic device 10 which is mounted on the cross member 12. The bracket 48 is mounted in position adjacent the shifting lever 50 and the conductors 56, 58, and 62 are connected to the various switches. Then, when the ignition switch is turned to an on position and the gear shift lever is moved to a driving position, one of the switches 52 will be closed energizing the electro-magnetic device 10.

When the electro-magnetic device 10 is energized the core 18 will be urged therefrom and the cables 26 will be in turn forced through the housings 22. This will cause the plungers 40 to be urged against the action of the spring into engagement with the apertures 46 in the lower surfaces of the doors 32. As long as the gear shift remains in driving position the electromagnetic device will be energized and the plungers will be retained in locking position. When the operator of the vehicle desires to allow someone to either enter or leave the car he will move the gear shift lever to a neutral position thereby de-energizing the electro-magnetic device 10 and causing the springs 44 to urge the plungers 40 out of operative position. Then the doors 32 may be easily opened.

From the foregoing, the construction and operation of the device will be readily understood and further explanation is believed to be unnecessary. However, since numerous modifications and changes will readily occur to those skilled in the art, it is not desired to limit the invention to the exact construction shown and described and accordingly, all suitable modifications and equivalents may be resorted to, falling within the scope of the appended claim.

What is claimed as new is as follows:

Locking means for the doors of vehicle bodies comprising cylinders mounted in the body adjacent the doors, spring retracted bolts slidable in the cylinders and engageable with the doors for securing said doors in closed position, a substantially U-shaped frame mounted on the vehicle, an electro-magnet including an armature mounted on the vehicle adjacent the frame, switch controlled means for electrically connecting said electro-magnet to a source of electric current, a bar mounted on the armature of the electro-magnet, flexible conduits extending from the cylinders to the frame, and Bowden wires in the conduits having one end anchored to the bar and their other ends connected to the bolts for projecting said bolts to operative position when the electro-magnet is energized.

References Cited in the file of this patent

UNITED STATES PATENTS

| | | |
|---|---|---|
| 2,160,011 | Beck | May 30, 1939 |
| 2,519,197 | Preston | Aug. 15, 1950 |
| 2,535,574 | Hill | Dec. 26, 1950 |